United States Patent Office 3,187,054
Patented June 1, 1965

3,187,054
PRODUCTION OF ORGANIC COMPOUNDS CONTAINING BORON-CARBON BONDS
George W. Willcockson, Arcadia, and Howard Steinberg, Fullerton, Calif., assignors to United States Borax & Chemical Corporation, Los Angeles, Calif., a corporation of Nevada
No Drawing. Filed Apr. 12, 1957, Ser. No. 652,367
8 Claims. (Cl. 260—606.5)

This invention has to do with improved methods of producing organic boron compounds having one or more boron-carbon bonds. Such compounds will be referred to herein for convenience of description as boron-carbon compounds.

Previously available processes for producing such boron-carbon compounds have been inconvenient and expensive. In particular, previous methods have required the use of relatively expensive raw materials, and have involved large quantities of organic solvents of a type involving serious fire and other hazards.

Some boron-carbon compounds have previously been produced by reaction of a boron-containing compound and a Grignard reagent or an organo-lithium compound. However, the initial ingredients for such reactions are impracticably expensive. The necessity of carrying out such reactions in highly volatile and inflammable solvents such as ether renders the previous processes inconvenient, dangerous and unreasonably expensive when attempted on a production scale.

Moreover, in many instances such previously available processes lead directly to a salt of a relatively expensive metal, such as lithium for example. For reasons of economy such metal must then usually be replaced before selling the product, requiring additional processing.

A superior method has now been discovered by which boron-carbon compounds may be produced from relatively economical initial ingredients.

A further advantage of the invention is that the reactions may be carried out in organic solvents that are not highly volatile and do not involve special hazards or require unusual precautions when used on a production scale.

The invention further permits direct production of metal-containing boron-carbon compounds in which the contained metal is sodium, which is relatively economical. Such products are thus suitable for marketing directly, eliminating the expense of carrying out additional reactions.

In accordance with the invention, those and other objects and advantages are accomplished by reacting a suitable boron trihalide, boron ester or boron-carbon compound with an organosodium compound. We have discovered that reactants of that type can be carried out with satisfactory yield in an inert hydrocarbon solvent which is safe and economical to handle.

The present invention is useful for producing four main classes of boron-carbon compounds, which may be characterized in terms of the number of boron-carbon bonds associated with a single boron atom. In the following summary of such compounds R and R' represent organic radicals which may be aryl or alkyl, substituted or non-substituted; and X represents a halogen atom.

(I) Compounds characterized by a single boron-carbon bond include, for example, the organic boronic acids, $RB(OH)_2$; the alkyl and aryl esters of such boronic acids, known as boronates, $RB(OR')_2$; and the organic boron dihalides, $RBX_2$.

(II) Compounds characterized by the two boron-carbon bonds include, for example, the organic borinic acids $R_2BOH$; the alkyl and aryl esters of such borinic acids, herein referred to as borinates, $R_2BOR'$; and the dialkyl and diaryl boron halides, $R_2BX$.

(III) Compounds characterized by three boron-carbon bonds include, for example, the trialkyl and triaryl boron compounds, $R_3B$.

(IV) Compounds characterized by four boron-carbon bonds include, for example, sodium tetraalkyl and tetraaryl boron, $R_4BNa$.

We have discovered that in general an appropriate compound of class I, II or III may be transformed into the corresponding compound of the next following class by reaction with a selected organosodium compound RNa. That type of reaction leads conveniently to mixed boron-carbon compounds in which a boron atom is linked by boron-carbon bonds to two or more different organic radicals, which may include both alkyl and aryl radicals.

We have further discovered that the necessary series of reactions to attain a selected member of any one of the described classes may in general be carried out as a unitary process from suitably selected initial ingredients consisting of an organosodium compound and a suitable boron trihalide or boron trialkyl or triaryl ester. The relative yields of the resulting products of the respective described classes may be adjusted, as by suitable proportioning of the initial ingredients and by suitable selection of the reaction conditions, especially the time and temperature, to enhance the yield of the desired product. The desired product or products may then be isolated from the reaction mixture.

The invention will be illustratively described, for the sake of clarity and definiteness, primarily as it relates to production of organo-boron compounds of the above type in which R represents an aryl group, which may be typified by phenyl, and R' represents an alkyl group, typically containing from one to twelve carbon atoms.

The selected organosodium compound may be prepared in the form of a dispersion in a suitable inert organic solvent. The following procedure is illustrative. Sodium metal is first dispersed in a suitable liquid medium which is inert to sodium and boils at a temperature above the melting point of sodium, such as the hydrocarbon solvents xylene, toluene, octane or decane, for example. Lower boiling solvents, such as benzene, for example, may be utilized by employing sufficient pressure to raise the effective boiling point above the melting point of sodium. A suitable dispersing agent may be added if desired. The sodium dispersal is preferably carried out at reflux temperature of the solvent and under an inert atmosphere such, for example, as dry nitrogen. The same inert gas is preferably utilized throughout the subsequent reactions. Satisfactory results are obtainable with a sodium dispersion containing, for example, five to ten gram atoms of metal (115 to 230 grams) per liter of solvent.

The desired organosodium compound may be prepared from the sodium dispersion in any suitable manner. For example, some organic compounds, such as acetylene and fluorene, for example, have an active hydrogen atom which can be replaced directly by sodium. Sodium may be directly added to some unsaturated organic compounds, such as naphthalene, for example, to form an organosodium compound. And in some instances one organosodium compound may be produced from another by transmetalation. In general, however, it is convenient to produce the desired organosodium compound by reaction of sodium metal with a suitable halogen-substituted organic compound. For example, for preparation of phenylsodium the organohalide may be chlorobenzene, which may be added slowly directly to the sodium dispersion, preferably with cooling. The organohalide may be provided, for example, in a molar ratio from 1:2 to 1:3 with respect to the available sodium. A dispersion of the desired organosodium compound in a solvent, typically toluene, is thereby obtained. In the illustrative instance of phenylsodium, a dispersion containing approximately 2 to 5 moles of phenylsodium per liter may readily be obtained.

The organosodium compound thus produced may be reacted with the desired boron-containing compound by adding one of the reactants slowly to the other with continuous stirring. When the resulting reaction is desired to go to substantial completion, as for production principally of a product of the type represented by class IV, described above, the molar ratio of organosodium compound to boron-containing compound is preferably equal to or greater than the theoretical value of 4. And the reaction mixture may then be warmed typically to a temperature of 50 to 80° C. and ample time, for example several hours, may be allowed for the reaction to go substantially to completion. In many instances the heat of reaction produces considerable rise in temperature unless counteracted by suitable cooling.

On the other hand, when only one or two steps of the overall reaction sequence are desired, the proportions of the reactants are selected to provide the organosodium compound in molar ratio equal to or less than the theoretical value for the desired reaction. Also, reduction of the reaction temperature has been found to favor maximum yield to the mono- or di-substituted products.

We have further discovered that, whereas reactions of organosodium compounds with boron trichloride and boron tribromide can produce compounds in all four groups, they lead particularly effectively to the production of compounds having three or four boron-carbon bonds; and that reactions of organosodium with boron esters tend to favor production of compounds having one or two boron-carbon bonds.

We have further discovered that in order to obtain a good yield of boron-carbon compound having less than four boron-carbon bonds it is highly desirable to carry out the reaction by introducing the organosodium compound slowly into the boron-containing compound rather than the other way around. That is particularly important when the boron-containing compound is boron chloride or bromide.

A full understanding of the invention and of its further objects and advantages will be had from the following description of certain illustrative manners of carrying it out. The particulars of the embodiments to be described are intended only for illustration, and not as a limitation upon the scope of the invention.

*Example 1*

Benzeneboronic acid was prepared by reaction of phenylsodium and triisopropyl borate by the following illustrative procedure. A sodium dispersion was first prepared by charging a suitable dispersing apparatus with toluene and adding a weighed quantity of sodium. The system was purged with dry nitrogen, and an atmosphere of nitrogen was maintained in the apparatus in this and in the following examples, throughout the operation as long as any material sensitive to oxygen was present. After heating to reflux temperature, the sodium was dispersed by operating a dispersion type stirrer at high speed for several minutes. The resulting dispersion was then cooled to 25 to 30° C.

To a sodium dispersion prepared in that manner from 4.7 gram-atoms of sodium in one liter of toluene was added 2 moles of chlorobenzene. The addition was made slowly at first until the reaction commenced, after about two minutes, and then at such a rate that the temperature could readily be maintained at 25 to 30° C. by a cooling bath. The resulting phenylsodium-toluene mixture was added slowly to a mixture of 2.5 moles of triisopropyl borate in 0.4 liter of toluene, cooled to about −5° C., while stirring both mixtures rapidly. After the addition of the phenylsodium was complete, the reaction mixture was stirred for an additional period of about an hour at the same temperature.

The excess sodium was destroyed by addition of 1.4 moles of isopropyl alcohol. The reaction mixture was then acidified by addition of 2.7 moles of dilute aqueous hydrochloric acid, enough water being added to dissolve any remaining solid phase. The mixture was then transferred to a separatory funnel and the organic phase was separated. The aqueous phase was extracted with ether. The ether washings were combined with the organic fraction and the mixture was distilled almost to dryness. Then approximately 200 ml. of water was added to insure the hydrolysis of any ester present, and the mixture was evaporated to dryness at reduced pressure. The resulting crude benzeneboronic acid was taken up in hot water, using approximately 100 ml. of water for each 15 grams of solid. An insoluble oil fraction separated and was drawn off. This was found to be composed primarily of diphenylborinic acid, which may be isolated as the acid anhydride by distillation, or in the form of an ester, for example as described below in Example 6. The remaining hot aqueous solution was treated with decolorizing carbon and filtered. Benzeneboronic acid was recrystallized from the filtrate by cooling to about 5° C., and the product was collected on a Buchner funnel and dried in air. The resulting recrystallized benzeneboronic acid was practically colorless. The products from several runs exhibited a neutralization equivalent having values from 119 to 122 (theoretical value 121.9). The yield of recrystallized benzeneboronic acid, based on the amount of chlorobenzene used, was 67%.

Benzeneboronic acid may also be produced by a procedure similar to that of Example 1, but replacing the triisopropyl borate by other alkyl borates, such as methyl borate and butyl borate, for example.

*Example 2*

If desired, the product from a reaction of the type described in Example 1 may be isolated as an ester of benzeneboronic acid. For example, diisopropyl benzeneboronate was prepared from phenylsodium and triisopropyl borate by the following illustrative procedure. A sodium dispersion was prepared as already described, using 1.17 gram-atoms of sodium and 0.5 liter of toluene. To that dispersion 0.5 mole of chlorobenzene was added as in Example 1 to give a toluene dispersion of phenylsodium. That dispersion was added slowly to a mixture of 1.25 moles of triisopropyl borate in 0.2 liter of toluene at approximately 0° C., and the reaction mixture was stirred at constant temperature for about 2 hours. The excess sodium was destroyed by addition of 0.33 mole of isopropyl alcohol to the cold mixture. About 0.7 mole glacial acetic acid was added to neutralize the sodium isopropylate and to break the sodium phenyl triisopropyl borate addition complex. The mixture was then filtered by suction and the filtrate was distilled to obtain the benzeneboronic acid ester produced by the reaction. In that distillation the toluene and excess triisopropyl borate were distilled first, and the diisopropyl benzeneboronate was obtained at 109 to 110° C. and at 19 to 20 mm. of Hg pressure.

The diisopropyl benzeneboronate produced in the manner just described was found on analysis to contain 5.25% boron by weight (theoretical value, 5.32%). The yield was 50%, based on the chlorobenzene used.

Other dialkyl benzene boronates can be produced by the procedure of Example 2, by replacing the diisopropyl borate by a corresponding quantity of another alkyl borate, such as methyl borate or butyl borate, for example.

Dialkyl benzeneboronates produced by the method of Example 2 can be converted into benzeneboronic acid by hydrolysis. For example, the illustrative product of Example 2 was shaken with water, using approximately 100 ml. of water for each 15 grams of diisopropyl benzeneboronate, and allowed to stand. After removal of the isopropyl alcohol and some water by distillation or by evaporation at reduced pressure, the water solution was cooled to crystallize benzeneboronic acid as colorless needles. After filtration and drying, the product, which exhibited a neutralization equivalent of 121±1 (theoretical value, 121.8), amounted to 82% recovery on the ester hydrolyzed. That yield can be increased by recovery of further acid by ether extraction of the mother liquor.

*Example 3*

As a further example of isolation of esters of benzeneboronic acid, the process described in Example 1 was carried out as far as the distillation of the reaction product. At that point one mole of ethylene glycol was added for each mole of benzeneboronic acid theoretically present. After removal of the ether, alcohol, toluene and water by distillation, the excess ethylene glycol was removed by adding toluene and separating the insoluble ethylene glycol layer. Substantially pure ethylene benzeneboronate was then obtained as distillate at 113 to 115° C. and about 20 mm. of Hg pressure. Analysis of the product showed a content of 7.65% boron (theoretical value, 7.31%).

*Example 4*

As an example of the production of organic boron dihalides, phenylboron dichloride was produced from phenylsodium and boron trichloride by the following illustrative procedure. A suspension of phenylsodium was prepared as already described from 2.17 gram-atoms of sodium and 1.0 mole of chlorobenzene in toluene, and was added slowly to a solution of 1.5 moles of boron trichloride in toluene at −70° C. The mixture was stirred for 1.5 hours at −65 to −75° C. and then allowed to return to room temperature. The reaction mixture was filtered and the filtrate distilled. Phenylboron dichloride was collected at 73 to 78° C. and 22 to 24 mm. of Hg pressure, the amount of product corresponding to a 50% yield based on the unrecovered boron trichloride. Hydrolysis of this product yielded benzeneboronic acid.

Further distillation of the filtrate described above produced diphenylboron chloride in a yield of approximately 25%. The yield of that product is increased by increasing the molar ratio of phenylsodium to boron trichloride towards the theoretical value of 2:1. Phenylboron dibromide and diphenylboron bromide can be produced in a corresponding manner, substituting boron tribromide for the boron trichloride described above.

*Example 5*

As an example of production of alkylboronic acids in accordance with the invention, n-butylboronic acid was prepared by the following illustrative procedure from n-butyl sodium and triisopropyl borate. A sodium dispersion was prepared from 1.17 gram-atoms of sodium in a mixture of heptane and decane in proportions of about 8:1. A solution of 0.5 mole of n-butyl chloride in 75 ml. of benzene was added slowly to the sodium dispersion at −10° C. After completion of the reaction the resulting suspension was reacted with 2.5 moles of triisopropyl borate, and stirring was continued at −5° C. for about 2 hours. The excess sodium was decomposed and the base neutralized by addition of 44 ml. of glacial acetic acid to the cold reaction mixture. The mixture was filtered by suction and the filtrate distilled. After recovery of the excess triisopropyl borate and decane, the residue was hydrolyzed by shaking with water, yielding n-butylboronic acid as a colorless crystalline solid. The product was collected on a Buchner funnel, dried and recrystallized from toluene. The product had a melting point of 84 to 87° C. and a neutralization equivalent of 105 to 107.

Other alkylboronic acids, such as ethylboronic acid, pentylboronic acid and dodecylboronic acid, for example, in which the alkyl groups contain from one to twelve carbon atoms each, may be produced by a procedure such as that of Example 5, replacing the n-butyl chloride used in that example by the appropriate alkyl chloride.

*Example 6*

As an example of the preparation of boron esters containing two boron-carbon bonds, alkyl diphenylborinates may be produced by reaction of phenylsodium and alkyl borates. The following illustrative procedure utilizes the typical reaction of phenylsodium and triisopropyl borate to give isopropyl diphenylborinate. A sodium dispersion was prepared from 3.1 gram-atoms of sodium in 500 ml. of toluene, and was reacted with 1.32 moles of chlorobenzene in the manner already described. A solution of 0.66 mole of triisopropyl borate in 100 ml. of benzene was reacted with the phenylsodium dispersion at about 0° C., and the mixture was stirred at 0 to 5° C. for 3 hours. After addition of 75 ml. of isopropyl alcohol and 325 ml. of 6 N hydrochloric acid, 400 ml. of additional water was added to dissolve the remaining solids. The organic layer of the resulting mixture was separated and distilled, yielding isopropyl diphenylborinate at 100 to 115° C. and about 1 mm. of Hg pressure. The total yield of diphenyl-substituted product was at least 50%.

Isopropyl diphenyl borinate produced in the described manner has been hydrolyzed to give diphenylborinic acid, which was isolated as its anhydride and also in the form of 2-aminoethyl diphenylborinate.

*Example 7*

As an example of boron-carbon compounds in which a boron atom is directly bonded to three carbon atoms, triphenylboron was prepared in the following illustrative manner. A dispersion of phenylsodium was prepared from 3.5 gram-atoms of dispersed sodium and 1.5 moles of chlorobenzene in a solution of 0.7 liter of toluene and 0.1 liter of mineral oil. That dispersion was added slowly to a solution of 0.57 mole of boron trichloride in toluene at a temperature of approximately −50° C. The mixture was stirred for several hours at low temperature and then allowed to return to room temperature. The reaction mixture was filtered to remove solid impurities, and the filtrate was distilled. After distillation of an appreciable proportion of diphenylboron chloride, triphenylboron was collected in an amount equivalent to a yield of 70% on the chlorobenzene used.

*Example 8*

A suspension of n-butylsodium was prepared in a solution of mineral oil and octane by dispersing 3.5 gram-atoms of sodium in that solvent and reacting it with 1.5 moles of n-butyl chloride at 0 to 10° C. The n-butylsodium suspension was added to a solution of 0.53 mole of boron trichloride in octane at a low temperature as in Example 7. Filtration and distillation yielded tri-n-butylboron at 99.8 to 101.0° C. and 14 mm. of Hg pressure, the amount of that product corresponding to a yield of 57%.

*Example 9*

As an example of the production of boron-carbon compounds in which a boron atom is directly bonded to four carbon atoms, sodium tetraphenylboron was produced by the following illustrative procedure. About 5.9 moles of sodium was dispersed in 0.9 liter of toluene in the presence of 1.0 gram of the polymerized fatty acid dispersing agent known as "Empol 1022." To that dispersion, a solution of 2.9 moles of chlorobenzene in 350 ml. of toluene was added in the manner already described. The resulting dispersion of phenylsodium was cooled in a Dry Ice-acetone bath and 0.65 mole of liquid boron trichloride was added slowly with constant stirring. Alternatively, gaseous boron trichloride can be introduced below the surface of the mixture cooled in an ice-water bath. Stirring was continued, and after about 30 minutes the temperature of the reaction mixture was allowed to rise slowly, reaching 60° C. after about two hours. External heat was then applied to maintain the reaction at about 70° C. for a further 1.5 hours to complete the reaction.

The resulting mixture was then cooled, and 50 ml. of methanol added to destroy excess sodium and phenylsodium. The solid sodium tetraphenylboron was then removed from the reaction mixture by filtration, the filter cake being finally dried under reduced pressure and at a temperature of 60 to 75° C. The solid sodium tetraphenyl boron was then washed with water to remove the sodium chloride produced by the reaction and any base resulting from the excess sodium. Only about 100 ml. of water is preferably used for each 35 grams of sodium chloride theoretically present. The added water then becomes substantially saturated with sodium chloride and dissolves a minimum amount of the desired product.

The yield of crude sodium tetraphenyl boron obtained in the described manner was approximately 90%. On the other hand, when a corresponding reaction was attempted with boron trifluoride in place of boron trichloride, only an impracticably low yield, less than 30%, was obtained.

A remarkably simple and economical procedure has been discovered for further purifying the crude products of the described type having four boron-carbon bonds. Purification of such substances by recrystallization is not always practicable, because the solubility in known solvents that are completely inert with respect to the compound either is too high, is inconveniently low, or changes only slowly with temperature. For example, the solubility of sodium tetraphenylboron in chloroform increases with decreasing temperature, but even at −70° C. is less than 10 grams per liter. Sodium tetraphenylboron also exhibits an inverse solubility-temperature relation in mixtures of toluene and either acetone or tetrahydrofuran, but only moderate separation is obtained by warming such solutions. The process to be described, on the other hand, provides substantially complete recovery with a remarkably high ratio of purification from each cycle of operation.

In the purification of the present illustrative product, the solid sodium tetraphenylboron to be purified is put into solution in a mixture of a first solvent in which it is highly soluble, such as acetone, methanol and acetonitrile, for example, and a second solvent in which it is substantially insoluble, such as toluene, benzene, and heptane, for example, the solvents being so selected that the boiling point of the first is appreciably lower than that of the second. The resulting mixture is then filtered to remove insoluble impurities, and the product is precipitated from the filtrate by removal of the first solvent by evaporation. A sufficient quantity of the first solvent must be used to completely dissolve the sodium tetraphenylboron. Excellent results are obtainable, for example, with from about 1 to about 3 liters of acetone per kilogram of crude product. It is convenient to use a considerably larger quantity of toluene, for example from 4 to 12 liters per kilogram of product, in order to maintain fluidity of the mixture as the product separates upon removal of acetone.

Removal of the acetone after filtration is accomplished by distillation, preferably at reduced pressure. As the solvent mixture loses acetone and becomes more concentrated in toluene, the dissolved product begins to separate out. Vigorous stirring is desirable at this stage to prevent the product from caking on the sides of the vessel. Distillation may be interrupted from time to time to remove the accumulated solid product by filtration from the hot mixture; or additional toluene may be added to keep the suspension effectively fluid until all acetone has been removed and the entire product can be collected at once. The collected product is preferably washed with a solvent in which it is insoluble, such as toluene, for example, and is then dried unless a further cycle of purification is to be carried out.

The described purification process typically produces sodium tetraphenylboron of at least 95% purity, the exact value depending upon details of the procedure. To produce a product of highest purity, the described purification procedure, including trituration with acetone, combining with toluene, filtration and separation of the product by distillation, is preferably performed at least twice.

An illustrative sample of sodium tetraphenylboron prepared in the described manner was tested, after two such purification procedures, for quantitative precipitation of potassium. A sample weighing 1.2530 grams was dissolved in water. A solution containing excess potassium chloride was added, and the mixture was allowed to stand for one hour. The precipitate was collected on a weighed, sintered-glass filter, washed carefully, and dried. The dried precipitate weighed 1.3102 grams, compared to a theoretical value of 1.3120. This indicates that the product was 99.9% pure.

An alternative method has been discovered for separating the initial crude product from the reaction mixture in which it is formed. After carrying out the reaction between phenylsodium and boron trichloride, preferably in the manner described, to produce sodium tetraphenylboron as a suspension in toluene, the crude product can be separated from the reaction mixture by a procedure which does not require any preliminary drying step. Glacial acetic acid is added to destroy any excess sodium and phenylsodium; or, if methanol is added for that purpose, glacial acetic acid is added to neutralize the resulting sodium methoxide. Acetic acid is compatible with the solvents employed in the present process. Stronger acids than gracial acetic are not satisfactory for the described purpose, since they have been found to decrease the yield of sodium tetraphenylboron to an excessive extent. The amount of acid required depends upon the amounts of sodium and excess phenylsodium present. The proper amount in each instance to produce complete neutralization may be determined by adding acid until a test with moist litmus paper indicates presence of free acid.

Enough acetone is then added to completely dissolve the sodium tetraphenylboron. It may be convenient to add at least a portion of the acetone before or during the acid addition. The insoluble impurities are then removed by filtration. The filter cake, consisting largely of sodium chloride and sodium acetate, is preferably triturated with acetone to minimize loss of product. The filtrate consists essentially of sodium tetraphenylboron dissolved in a mixture of acetone and toluene. Crude sodium tetraphenylboron may be removed from that solution by elimination of the acetone in the manner already described in connection with the procedure for further purification of the product.

The sodium tetraphenylboron isolated by the second described procedure, or by the procedure of Example 9 followed by one stage of recrystallization, typically has a purity of approximately 95% and represents from about 70 to about 80% of the theoretical yield based on the boron trichloride used. The yield is typically somewhat higher with the first described isolation procedure, but the second described procedure has the advantage of considerably greater economy of time and materials.

We claim:

1. The method of producing sodium tetraphenylboron, which method comprises reacting phenylsodium and boron trichloride in an inert hydrocarbon solvent, the molar ratio of phenylsodium to boron trichloride being at least about 4, and isolating sodium tetraphenylboron produced by the reaction.

2. The method of producing sodium tetraphenylboron, which method comprises reacting boron trichloride with a dispersion of phenylsodium in toluene, the molar ratio of phenylsodium to boron trichloride being at least about 4, and isolating sodium tetraphenylboron produced by the reaction.

3. The method of producing sodium tetraphenylboron, which method comprises providing a dispersion of phenylsodium in toluene, reacting boron trichloride with said dispersion at a temperature below about 10° C., and in a molar ratio of boron trichloride to phenylsodium between about 1:4 and about 1:5 to initiate reaction thereof, and completing said reaction at a temperature between about 60 and about 80° C., and isolating sodium tetraphenylboron produced by the reaction.

4. The method of producing sodium tetraphenylboron, which method comprises reacting boron trichloride with a dispersion of phenylsodium in toluene, the molar ratio of phenylsodium to boron trichloride being at least about 4, supplying glacial acetic acid to the reaction mixture in a quantity to neutralize alkalinity therein, supplying acetone in a quantity to dissolve the sodium tetraphenylboron produced by the reaction, filtering the resulting mixture, and removing acetone from the filtrate to precipitate sodium tetraphenylboron therefrom.

5. The method of producing sodium tetraphenylboron, which method comprises reacting boron trichloride with a dispersion of phenylsodium in toluene, the molar ratio of phenylsodium to boron trichloride being at least about 4, supplying methanol to the reaction mixture in a quantity to destroy any residual sodium and phenylsodium, filtering the resulting mixture to remove the solid sodium tetraphenylboron produced by the reaction, triturating the filter cake with only substantialy enough water to dissolve the sodium chloride present, and separating the solid sodium tetraphenylboron from the resulting mixture.

6. The method of purifying a crude organoboron compound having a boron atom directly bonded to four carbon atoms, said method comprising dissolving the crude product in a mixture consisting essentially of a first solvent selected from the group consisting of acetone, methanol and acetonitrile, and a second solvent selected from the group consisting of toluene, benzene and heptane, said second solvent having an appreciably higher boiling temperature than said first solvent, evaporating said first solvent to precipitate said product, and recovering the precipitate.

7. The method of purifying crude sodium tetraphenylboron, said method comprising dissolving the crude product in a solvent consisting essentially of acetone and toluene, separating acetone from the resulting solution to precipitate sodium tetraphenylboron, and recovering the precipitate.

8. The method of purifying crude sodium tetraphenylboron which comprises slurrying the crude compound with toluene, combining the slurry with from about 1 to about 3 liters of acetone per kilogram of crude compound, distilling acetone from the resulting mixture to precipitate sodium tetraphenylboron, and recovering the precipitate.

References Cited by the Examiner
UNITED STATES PATENTS
3,119,857  1/64  Yates _____ 260—462
FOREIGN PATENTS
705,719  3/54  Great Britain.

OTHER REFERENCES

Jones et al.: Chem. Reviews, vol. 54, pg. 875 (1954).
Mikhailov: Chem. Abstracts, vol. 50, pg. 11963–4 (1956).
Mikhailov: Chem. Abstracts, vol. 49, pg. 13142 (1955).
Mikhailov: Chem. Abstracts, vol. 51, pg. 1026 (Jan. 25, 1957).
Mikhailov: Chem. Abstracts, vol. 51, pg. 1874 (Feb. 10, 1957).
Wittig et al.: Chem. Abstracts, vol. 46, pg. 6607–8 (1952).

TOBIAS E. LEVOW, *Primary Examiner.*

ROGER L. CAMPBELL, LEON D. ROSDOL, WILLIAM G. WILES, *Examiners.*